(12) United States Patent
Tajima et al.

(10) Patent No.: US 7,521,832 B2
(45) Date of Patent: Apr. 21, 2009

(54) ROTATING ELECTRIC MACHINE HAVING ROTOR EMBEDDED-PERMANENT-MAGNETS WITH INNER-END MAGNETIC GAPS AND OUTER-END MAGNETIC GAPS, AND ELECTRIC CAR USING THE SAME ELECTRIC MACHINE

(75) Inventors: Fumio Tajima, Hitachi (JP); Yutaka Matsunobu, Hitachinaka (JP); Masashi Kitamura, Mito (JP); Noriaki Hino, Mito (JP); Takashi Kobayashi, Hitachiota (JP); Shigeru Kakugawa, Hitachi (JP); Takashi Yasuhara, Yotsukaido (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/611,206

(22) Filed: Dec. 15, 2006

(65) Prior Publication Data

US 2007/0085436 A1 Apr. 19, 2007

Related U.S. Application Data

(63) Continuation of application No. 11/052,753, filed on Feb. 9, 2005, now Pat. No. 7,151,335.

(30) Foreign Application Priority Data

Mar. 10, 2004 (JP) ............... 2004-066465

(51) Int. Cl.
- *H02K 1/12* (2006.01)
- *H02K 1/27* (2006.01)
- *H02K 21/14* (2006.01)

(52) U.S. Cl. .............. 310/156.48; 310/156.53; 310/156.54; 310/156.56; 310/156.57

(58) Field of Classification Search ................
310/156.48–156.57, 261, 216
See application file for complete search history.

(56) References Cited

U.S. PATENT DOCUMENTS 6,147,428 A 11/2000 Takezawa et al.

(Continued)

FOREIGN PATENT DOCUMENTS

JP 5-103453 A 4/1993

(Continued)

OTHER PUBLICATIONS

Hirose, Keiichi, Introduction to Electric Machine Design (Second Edition), The Institute of Electrical Engineers of Japan, Aug. 31, 1951, pp. 159-161, Meisei University, Denki Sekkei Gairon.

(Continued)

*Primary Examiner*—Tran N Nguyen
(74) *Attorney, Agent, or Firm*—Crowell & Moring LLP

(57) ABSTRACT

A permanent magnet rotating electric machine comprises a stator having stator windings wound round a stator iron core and a permanent magnet rotor having a plurality of inserted permanent magnets in which the polarity is alternately arranged in the peripheral direction in the rotor iron core. The rotor iron core of the permanent magnets is composed of magnetic pole pieces, auxiliary magnetic poles, and a stator yoke, and furthermore has concavities formed on the air gap face of the magnetic pole pieces of the rotor iron core of the permanent magnets, gently tilting from the central part of the magnetic poles to the end thereof.

In a permanent magnet rotating electric machine, effects of iron loss are reduced, and an electric car using highly efficient permanent magnet rotating electric machine are realized.

10 Claims, 7 Drawing Sheets

U.S. PATENT DOCUMENTS

| | | | |
|---|---|---|---|
| 6,342,745 B1 * | 1/2002 | Sakai et al. | 310/156.56 |
| 6,441,524 B2 * | 8/2002 | Kaneko et al. | 310/156.45 |
| 6,441,525 B1 * | 8/2002 | Koharagi et al. | 310/156.56 |
| 6,486,581 B2 * | 11/2002 | Miyashita et al. | 310/156.53 |
| 6,759,778 B2 | 7/2004 | Nishiyama et al. | |
| 6,774,523 B2 * | 8/2004 | Ahn et al. | 310/216 |
| 6,803,692 B2 * | 10/2004 | Hattori et al. | 310/156.53 |
| 6,917,133 B2 * | 7/2005 | Koharagi et al. | 310/156.57 |
| 6,967,424 B2 * | 11/2005 | Popov | 310/216 |
| 7,057,322 B2 * | 6/2006 | Araki et al. | 310/156.53 |
| 7,151,335 B2 * | 12/2006 | Tajima et al. | 310/156.48 |
| 7,170,209 B2 * | 1/2007 | Araki et al. | 310/156.47 |
| 7,288,868 B2 * | 10/2007 | Tamaki et al. | 310/254 |

FOREIGN PATENT DOCUMENTS

| | | |
|---|---|---|
| JP | 8-251846 A | 9/1996 |
| JP | 9-261901 A | 10/1997 |
| JP | 10-262359 A | 9/1998 |
| JP | 11-27913 A | 1/1999 |
| JP | 11-164501 A | 6/1999 |
| JP | 2000-60038 A | 2/2000 |
| JP | 2000-116085 A | 4/2000 |
| JP | 2000-295805 A | 10/2000 |
| JP | 2001-178047 A | 6/2001 |
| JP | 2001-286110 A | 10/2001 |
| JP | 2002-78260 A | 3/2002 |
| JP | 2002-171730 A | 6/2002 |
| JP | 2002-209350 A | 7/2002 |

OTHER PUBLICATIONS

Japanese Office Action dated Dec. 5, 2006 with English translation (forty-one (41) pages).

* cited by examiner

ROTATING ELECTRIC MACHINE HAVING ROTOR EMBEDDED-PERMANENT-MAGNETS WITH INNER-END MAGNETIC GAPS AND OUTER-END MAGNETIC GAPS, AND ELECTRIC CAR USING THE SAME ELECTRIC MACHINE

CLAIM OF PRIORITY

The present application claims priority from Japanese application serial no. 2004-66465, filed on Mar. 10, 2004, the content of which is hereby incorporated by reference into this application.

FIELD OF THE INVENTION

The present invention relates to a permanent magnet rotating electric machine suitable for use for an electric car and the electric car using it.

BACKGROUND OF THE INVENTION

A motor used to drive an electric car, particularly an electric vehicle and a hybrid electric vehicle, is desired to be small, light, and highly efficient. In recent years, by development of a highly efficient magnet material, as a drive motor for an electric car (particularly an electric vehicle and a hybrid electric vehicle), in consideration of the respect that it can be made smaller, lighter, and more highly efficient than an induction motor and a reluctance motor, a permanent magnet motor has been used predominantly. The reason is that the permanent magnet motor can generate a large amount of magnetic flux without supplying a large current. Particularly, in a region of high torque at a low speed, the characteristic can be realized. On the other hand, at a high speed, an occurrence of iron loss and an occurrence of high voltage due to the magnetic flux amount often come into a problem.

As a rotor structure of a motor used for an electric car, particular an electric vehicle and a hybrid electric vehicle, in consideration of countermeasures for an occurrence of iron loss and an occurrence of high voltage and retention of permanent magnets, an embedding type permanent magnet rotating electric machine for embedding permanent magnets in a laminated silicone steel plate is known. Furthermore, as described in Japanese Patent Laid-Open No. Hei09(1997)-261901, as a structure of reducing the rate of torque by magnets and reducing the magnetic flux amount of permanent magnets, a structure of arranging auxiliary salient poles between permanent magnets is known. In this structure, since the magnetic flux of the permanent magnets is little, the iron loss at a comparatively high speed is little, while in a region requiring low speed torque, reluctant torque is produced by the auxiliary salient poles and little magnetic torque can be compensated for.

SUMMARY OF THE INVENTION

However, even in the structure described in Japanese Patent Laid-Open No. Hei09(1997)-261901, particularly in a case of a drive motor used in a hybrid electric vehicle, the iron loss due to the magnetic flux of the permanent magnets becomes braking force and increases fuel expenses of the car, so that the iron loss in a high-speed region comes into a problem.

Further, as a motor used to drive an electric car, particularly an electric vehicle and a hybrid electric vehicle, the reduction in the torque ripple is important from the viewpoint of comfortableness to ride in and noise reduction, though this respect is not taken into account in conventional motors.

The first object of the present invention is to provide a highly efficient permanent magnet rotating electric machine capable of more reducing effects of iron loss and an electric car using it.

Further, the second object of the present invention is to provide a permanent magnet rotating electric machine of a low torque ripple capable of reducing the torque ripple and an electric car using it.

(1) To accomplish the above first object, the present invention is a permanent magnet rotating electric machine comprising a stator having stator windings wound round a stator iron core and a permanent magnet rotor having a plurality of inserted permanent magnets in which the polarity is alternately arranged in the peripheral direction in the rotor iron core, wherein the iron core of the permanent magnet rotor is composed of magnetic pole pieces positioned on the air gap face of the permanent magnets for forming the magnetic path of the permanent magnets, auxiliary magnetic poles projected up to the air gap face of the permanent magnets for producing reluctant torque, and a stator yoke positioned on the reversed air gap face of the permanent magnets for forming the magnetic path of the auxiliary salient poles and permanent magnets, and the iron core has concavities formed on the air gap face of the magnetic pole pieces of the rotor iron core of the permanent magnets, gently tilting from the central part of the magnetic poles to the end thereof.

By use of such a constitution, the effect of iron loss can be reduced more and high efficiency can be realized.

(2) In (1) mentioned above, the change in the air gap length at the central part of the magnetic poles at the position of the concavities is preferably smaller than the change in the air gap length at the end of the magnetic poles.

(3) In (1) mentioned above, the air gap length of the auxiliary salient pole portion is preferably smaller than the air gap length of the magnetic pole piece portion.

(4) To accomplish the above second object, the present invention is a permanent magnet rotating electric machine comprising a stator having stator windings wound round a stator iron core and a permanent magnet rotor having a plurality of inserted permanent magnets in which the polarity is alternately arranged in the peripheral direction in the rotor iron core, wherein the iron core of the permanent magnet rotor is composed of magnetic pole pieces positioned on the air gap face of the permanent magnets for forming the magnetic path of the permanent magnets, auxiliary magnetic poles projected up to the air gap face of the permanent magnets for producing reluctant torque, and a stator yoke positioned on the reversed air gap face of the permanent magnets for forming the magnetic path of the auxiliary salient poles and permanent magnets, and the iron core has concavities formed on the air gap face of the magnetic pole pieces of the rotor iron core of the permanent magnets on both sides of the magnetic pole center at a position within the range from an electrical angle of 20° to 30° from the magnetic pole center when the number of slots of the stator iron core per pole and per phase is 2 or at a position within the range from an electrical angle of 15° to 45° from the magnetic pole center when the number of slots of the stator iron core per pole and per phase is 1.

By use of such a constitution, the torque ripple can be reduced.

(5) To accomplish the above first object, the present invention is an electric car comprising a permanent magnet rotating electric machine, wheels driven by the permanent magnet rotating electric machine, and a control means for controlling drive torque outputted by the permanent magnet rotating electric machine, wherein the permanent magnet rotating electric machine is composed of a stator having stator windings wound round a stator iron core and a permanent magnet rotor having a plurality of inserted permanent magnets in which the polarity is alternately arranged in the peripheral direction in the rotor iron core, and the iron core of the permanent magnet rotor is composed of magnetic pole pieces positioned on the air gap face of the permanent magnets for forming the magnetic path of the permanent. magnets, auxiliary magnetic poles projected up to the air gap face of the permanent magnets for producing reluctant torque, and a stator yoke positioned on the reversed air gap face of the permanent magnets for forming the magnetic path of the auxiliary salient poles and permanent magnets, and the iron core has concavities formed on the air gap face of the magnetic pole pieces of the rotor iron core of the permanent magnets, gently tilting from the magnetic pole central part to the end.

By use of such a constitution, an electric car of low vibration and low noise can be obtained.

(6) To accomplish the above second object, the present invention is an electric car comprising a permanent magnet rotating electric machine, wheels driven by the permanent magnet rotating electric machine, and a control means for controlling drive torque outputted by the permanent magnet rotating electric machine, wherein the permanent magnet rotating electric machine is composed of a stator having stator windings wound round a stator iron core and a permanent magnet rotor having a plurality of inserted permanent magnets in which the polarity is alternately arranged in the peripheral direction in the rotor iron core, and the iron core of the permanent magnet rotor is composed of magnetic pole pieces positioned on the air gap face of the permanent magnets for forming the magnetic path of the permanent magnets, auxiliary magnetic poles projected up to the air gap face of the permanent magnets for producing reluctant torque, and a stator yoke positioned on the reversed air gap face of the permanent magnets for forming the magnetic path of the auxiliary salient poles and permanent magnets, and the iron core has concavities formed on the air gap face of the magnetic pole pieces of the rotor iron core of the permanent magnets on both sides of the magnetic pole center at a position within the range from an electrical angle of 20° to 30° from the magnetic pole center when the number of slots of the stator iron core per pole and per phase is 2 or at a position within the range from an electrical angle of 15° to 45° from the magnetic pole center when the number of slots of the stator iron core per pole and per phase is 1.

By use of such a constitution, an electric car of low vibration and low noise can be obtained.

According to the present invention, an electric car in which the effect of iron loss can be reduced more, and a highly efficient permanent magnet rotating electric machine can be obtained, and fuel expenses can be reduced, and low vibration and noise can be realized can be obtained.

According to the present invention, a permanent magnet rotating electric machine of a low torque ripple can be obtained and an electric car of low vibration and noise can be obtained.

DESCRIPTION OF THE PREFERRED EMBODIMENTS

Hereinafter, the constitution of the permanent magnet rotating electric machine Of the first embodiments of the present invention will be explained with reference to FIGS. 1 to 6. Here, as an example, an example of a permanent magnet motor in which a rotating electric machine has a winding structure of distribution winding as a stator and a rotor has 8 poles will be explained.

Firstly, by referring to FIGS. 1 and 2, the whole constitution of the permanent magnet rotating electric machine of this embodiment will be explained.

Figure 1:
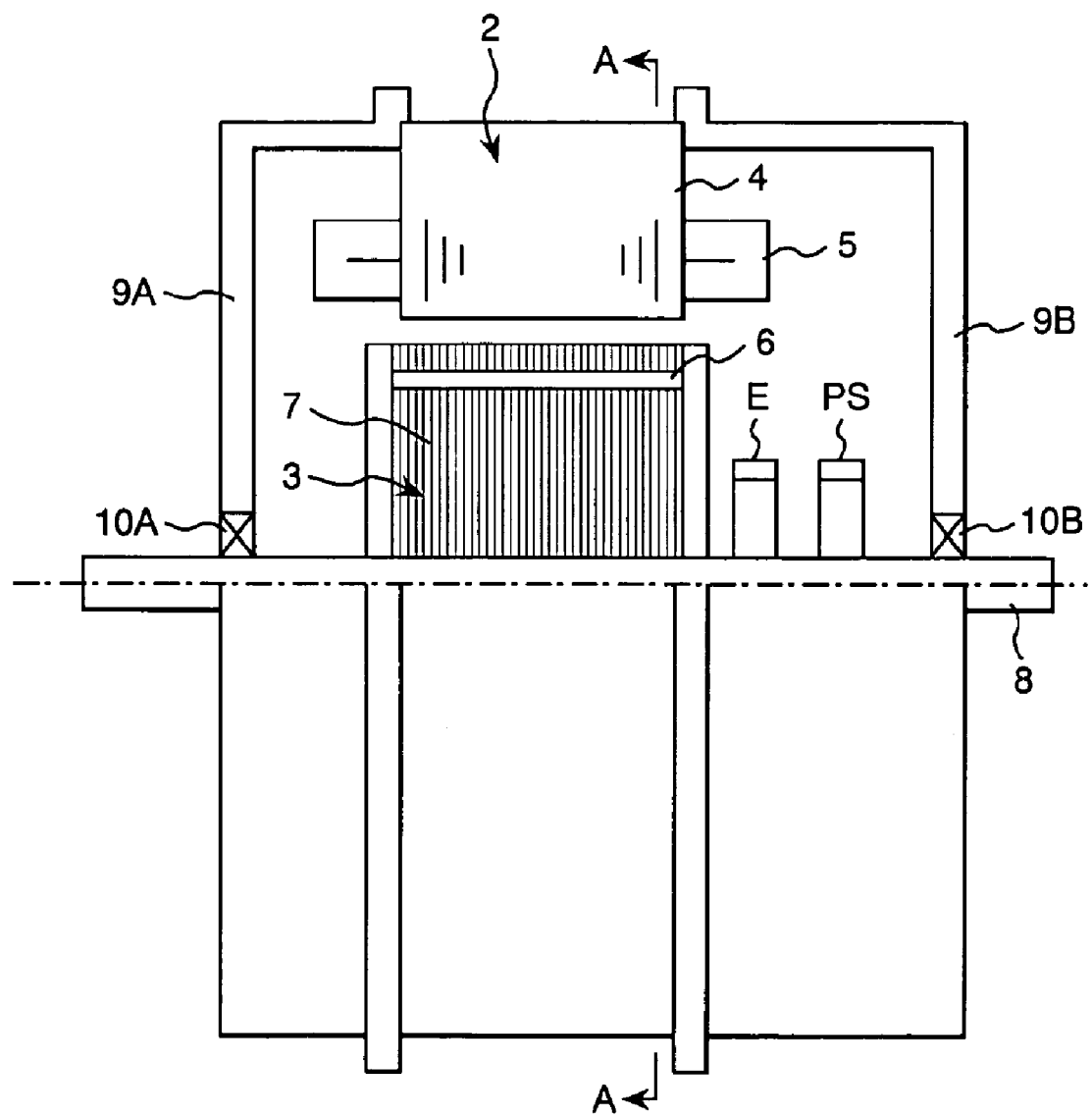
FIG. 1 is a cross sectional view showing the constitution of the permanent magnet rotating electric machine of the first embodiment of the present invention.
Figure 2:
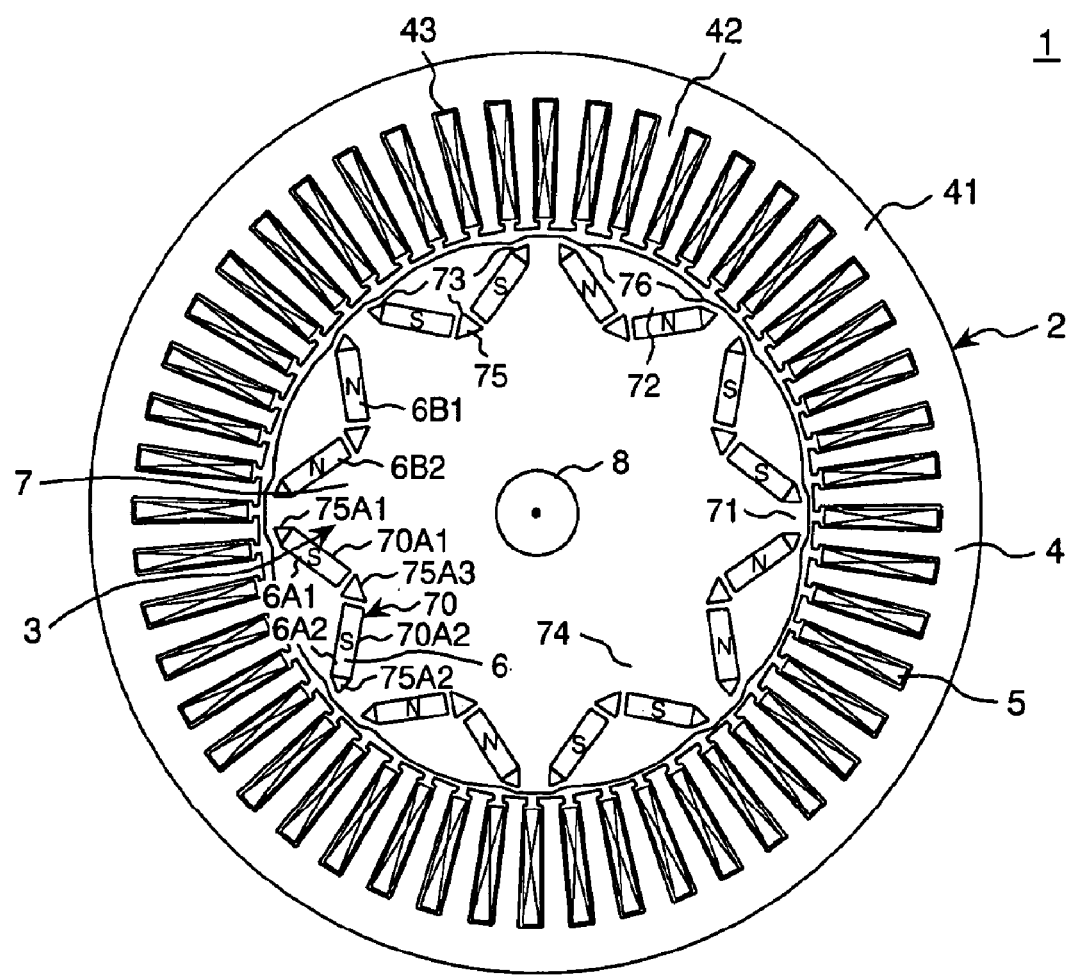
FIG. 2 is a cross sectional view showing the constitution of the permanent magnet rotating electric machine of the first embodiment of the present invention.

FIGS. 1 and 2 are cross sectional views showing the constitution of the permanent magnet rotating electric machine of the first embodiment of the present invention. FIG. 1 is a cross sectional view in the parallel direction with the rotation axis and FIG. 2 is a cross sectional view in the perpendicular direction to the rotation axis and a view in the A-A direction shown in FIG. 1. Further, in FIGS. 1 and 2, the same numerals indicate the same parts.

As shown in FIG. 1, a permanent magnet rotating electric machine 1 includes a stator 2, a rotor 3, and end brackets 9A and 9B. The stator 2 has a stator iron core 4 and stator windings 5. The rotor 3 has a rotor iron core 7 composed of a magnetic substance and a shaft 8. Further, the rotor 3, via the shaft 8 fit into the rotor iron core 7, is rotatably held by bearings 10A and 10B fit into the end brackets 9A and 9B.

Further, the constitution shown in the drawing has no frame on the outer periphery of the stator iron core 4. However, a frame may be used if necessary.

On the shaft 8 of the rotor 3, a magnetic pole position sensor PS for detecting the position of the rotor 3 and a position sensor E are installed. According to the position of the rotor detected by the magnetic pole position sensor PS for detecting the position of the rotor 3 and the position sensor E, a 3-phase current is supplied to the stator windings 5, thus a rotating magnetic field is generated. Magnetic attraction and repulsion force are generated between the rotating magnetic field and the permanent magnets of the rotor 3, thus continuous rotary power is generated. Here, when the current phase is properly selected, in the low speed and large torque region, the composite torque of the torque by permanent magnet torque 6 and the torque by auxiliary salient poles 71 is controlled so as to be maximized.

On the other hand, in the high speed region where the induced voltage of the permanent magnets is higher than the terminal voltage of the motor, the current vector is moved forward, thus the rotating magnetic field by the stator winding current is controlled by weak field control so as to be applied to the center of the permanent magnets 6 as demagnetizing force. By doing this, the magnetic flux of the permanent magnets 6 is effectively reduced, thus the iron loss of the rotating electric machine can be reduced and a highly efficient operation can be performed.

Next, as shown in FIG. 2, the stator iron core 4 is composed of a circular ring shaped stator yoke 41 and iron core teeth 42. Between the neighboring stator teeth 42, slots 43 for storing the stator windings 5 are installed. Here, round the stator windings 5, general 3-phase (phase U, phase V, phase W) distribution windings are wound. The number of stator teeth 42 is 48 and the number of slots 43 is also 48. The number of stator teeth (salient poles) 42 per phase is 16.

The rotor iron core 7 has insertion holes 70 for the permanent magnets 6 arranged at even intervals in the peripheral direction. The permanent magnets 6 are inserted into the insertion holes 70. The number of poles of the rotor 3 is 8 and the number of insertion holes 70 is 16. For example, permanent magnets 6A1 and 6A2 inserted into two insertion holes 70A1 and 70A2 constitute the same pole, thus one pole is formed. For example, assuming the polarity of the permanent poles 6A1 and 6A2 as pole S, the polarity of the neighboring permanent magnets 6B1 and 6B2 in the peripheral direction becomes pole N and mutual polarity is obtained in the peripheral direction. The insertion holes 70A1 and 70A2 are arranged symmetrically with respect to line in the radial direction of the rotor iron core 7 and in a V shape. Therefore, two permanent magnets 6B1 and 6B2 are arranged per magnetic pole, so that the flux density per magnetic pole is increased.

The rotor iron core 7 has magnetic pole pieces 72 installed on the outer periphery of the permanent magnets 6. The magnetic pole pieces 72 form a magnetic circuit through which the magnetic flux generated by the permanent magnets 6 flows toward the stator 2 via the air gap formed between the rotor 3 and the stator 2.

The permanent magnets 6 forming the respective magnetic poles adjoin each other via the auxiliary salient poles 71 which are a part of the rotor iron core 7. The auxiliary magnetic poles 71 bypass the magnetic circuit of the magnets and directly generate the magnetic flux on the stator side by the electromotive force of the stator. The magnetic pole pieces 72 and the auxiliary salient poles 71 are connected by bridges 73 to increase the mechanical strength thereof.

Between the magnets 6A1 and 6A2 and the bridges 73, triangular air gaps 75A1 and 75A2 are respectively formed and between the magnets 6A1 and 6A2 forming the same pole, a triangular air gap 75A3 is formed. Air exists inside the air gaps 75A1, 75A2, and 75A3 and the leakage flux is reduced.

The inner peripheral side of the insertion holes 70, the auxiliary salient poles 71, and the air gaps 75A1, 75A2, and 75A3 is a rotor yoke 74 constituting the magnetic path of the permanent magnets 6. By the above constitution, the so-called embedding type permanent magnet rotating electric machine is formed.

The aforementioned control by weak field current, by increasing the current, can reduce the basic wave part of the iron loss, though the high frequency component of the iron loss is increased inversely and after all, the iron loss may not be reduced.

On the other hand, when the air gap length is increased, the iron loss by high frequency waves is decreased. However, in correspondence to an increase in the air gap length, the torque is reduced. Therefore, it is important to suppress an increase in the iron loss at a high speed while suppressing the reduction in an occurrence of torque.

Therefore, in this embodiment, on the peripheral part of the rotor iron core 7, that is, on the air gap face of the magnetic pole pieces 72, concavities 76 gently tilting from the central part of the magnetic poles to the end thereof are formed. Particularly, since the concavities 76 gently tilting from the central part of the magnetic poles to the end thereof are formed on the air gap face of the magnetic pole pieces of the rotor iron core, when the air gap length at the central part of the auxiliary salient poles 71 and the magnetic pole pieces 72 which greatly contribute to an occurrence of torque and do not affect an occurrence of iron loss is reduced and the air gap portion of the magnetic pole pieces from the center of the magnetic poles to the end thereof causing high frequency iron loss rather than an occurrence of torque is increased as shown in FIG. 2, consistency of a reduction in the iron loss with insurance of an occurrence of torque can be realized. This respect will be explained by referring to FIG. 3 and the subsequent drawings.

Figure 3:
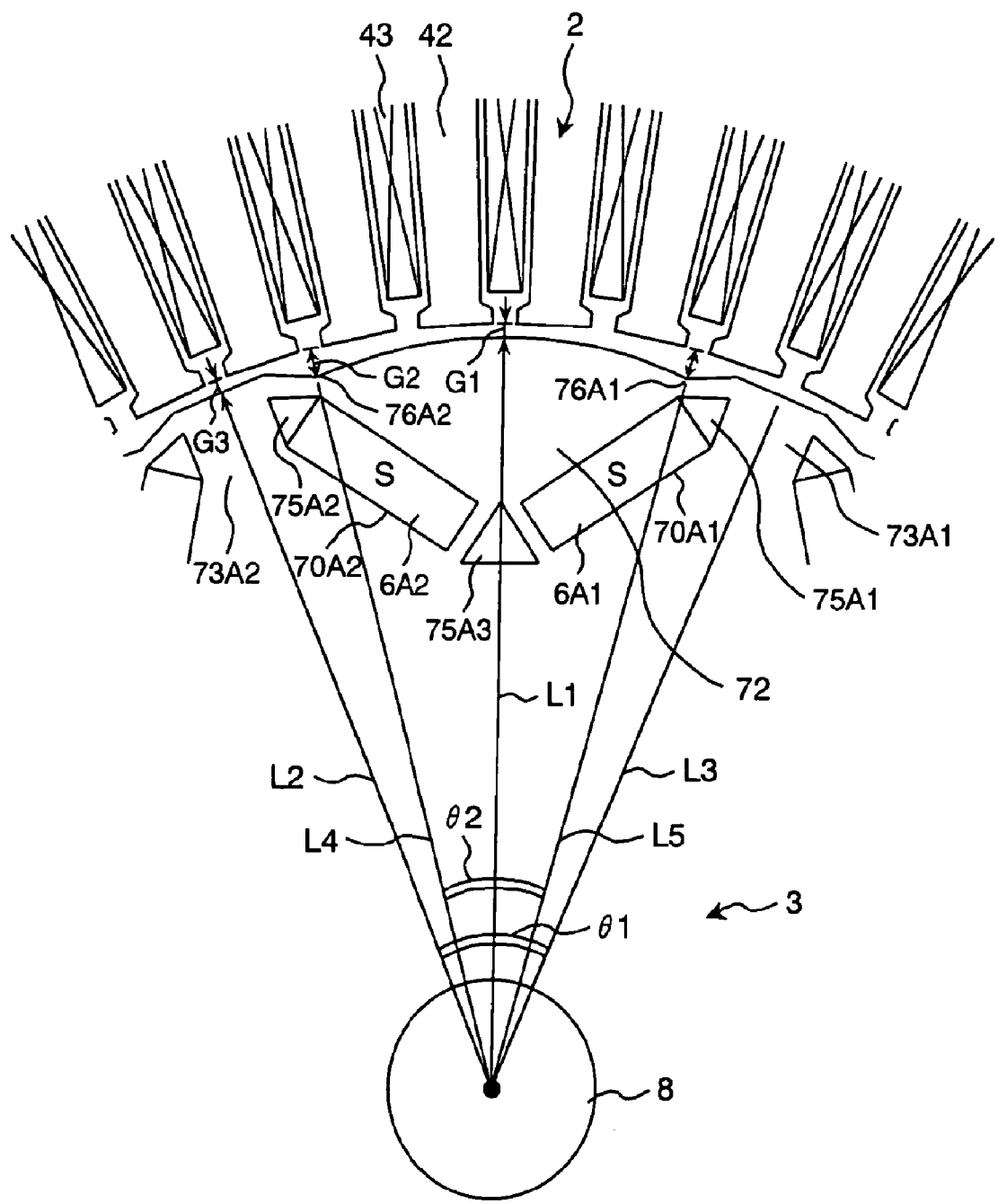
FIG. 3 is an enlarged cross sectional view showing the detailed constitution of the rotor of the permanent magnet rotating electric machine of the first embodiment of the present invention.

Next, by referring to FIG. 3, the detailed constitution of the rotor of the permanent magnet rotating electric machine of this embodiment.

FIG. 3 is an enlarged cross sectional view showing the detailed constitution of the rotor of the permanent magnet rotating electric machine of the first embodiment of the present invention. FIG. 3 shows the essential section shown in FIG. 2 which is enlarged. Further, the same numerals as those shown in FIG. 2 indicate the same parts.

The line connecting the center of the permanent magnets 6A1 and 6A2 constituting the same pole, that is, the center of the air gap 75A3 and the center of the rotor 3, that is, the center of the shaft 8 is assumed as L1. The insertion holes 70A and 70A2 are arranged so as to be symmetrical with respect to the line L1. Therefore, the permanent magnets 6A1 and 6A2 are also arranged so as to be symmetrical with respect to the line L1. The line L1 is a line indicating the central part of one magnetic pole.

Further, the lines connecting the centers of bridges 73A1 and 73A2 and the center of the rotor 3, that is, the center of the shaft 8 are assumed respectively as L2 and L3. The range between the lines L2 and L3 forms one magnetic pole. The angle $\zeta 1$ of one magnetic pole is an electric angle of 180° and is composed of 8 poles, so that it is a mechanical angle of 45°. Further, the angle $\theta 2$ in the drawn example is an electric angle of 130°.

Lines L4 and L5 are lines connecting the right corner of the permanent magnet 6A1 and the left corner of the permanent magnet 6A2 and the center of the rotor 3, that is, the center of the shaft 8.

Here, at the position of the central part of the magnetic poles, the air gap length between the outer peripheral part of the rotor 3 and the inner peripheral part of the stator 2 is assumed as G1, and the air gap length at the positions on the outer periphery of the rotor 3 where concavities 76A1 and 76A2 are formed are assumed as G2, and the air gap length at the end of the magnetic poles is assumed as G3. The air gap lengths G1 and G2 are longer than the air gap length G3 and in the rotor 3, in the neighborhood of the center of the magnetic pole portion thereof, the concavities 76 are formed on the outer periphery. Moreover, the air gap length G1 is shorter than the air gap length G2 and on the air gap face of the magnetic pole pieces 72, the concavities 76 gently tilting from the center of the magnetic poles to the end thereof are formed. An example of it is that the air gap length G1 is 0.5 mm, and the air gap length G2 is 1.5 mm, and the air gap length G3 is 0.3 mm.

Here, by referring to FIG. 4, the air gap length of the magnetic pole pieces of the rotor of the permanent magnet rotating electric machine of this embodiment will be explained concretely.

Figure 4:
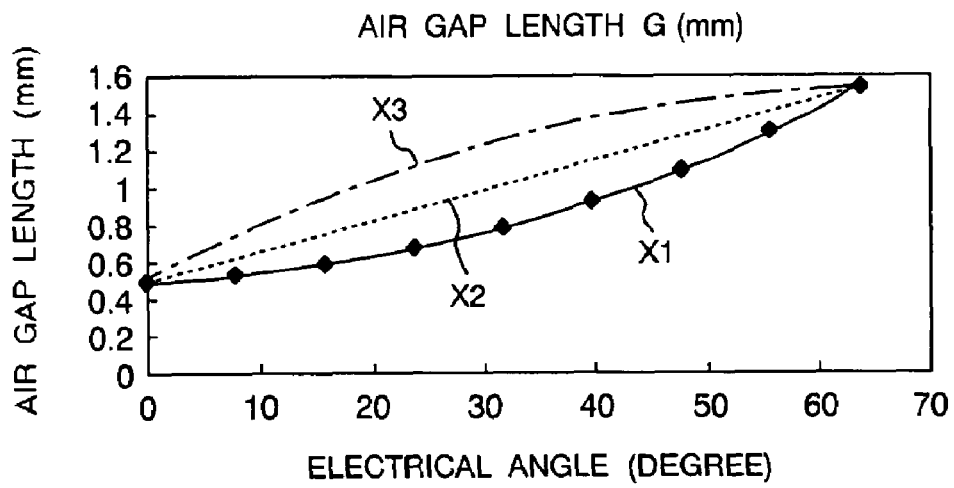
FIG. 4 is an illustration for the air gap length of the magnetic pole pieces of the rotor of the permanent magnet rotating electric machine of the first embodiment of the present invention.

FIG. 4 is an illustration for the air gap length of the magnetic pole pieces of the rotor of the permanent magnet rotating electric machine of the first embodiment of the present invention.

The air gap length G1 is assumed as 0.5 mm, and the air gap length G2 is assumed as 1.5 mm, and between them, the change in the air gap length, as shown by a solid line of X1 in FIG. 4, is in a shape convex downward. Namely, the change in the air gap length at the central part of the magnetic poles is smaller than the change in the air gap length at the end of the magnetic poles. Further, in the drawing, the dashed line X2 is a straight line and the alternate long and short dashed line X3 is a curve convex upward.

Here, by referring to FIGS. 5 and 6, the iron loss of the rotor of the permanent magnet rotating electric machine of this embodiment will be explained. Further, the values shown in FIGS. 5 and 6 are values obtained by theoretical calculation and are different from the values indicated in the explanation shown in FIG. 4.

Figure 5:
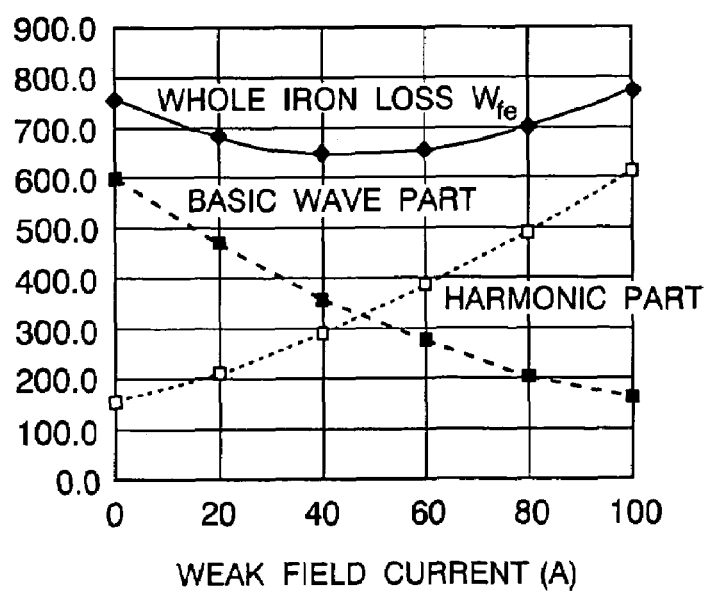
FIG. 5 is an illustration for iron loss of the rotor of the permanent magnet rotating electric machine of the first embodiment of the present invention.
Figure 6:
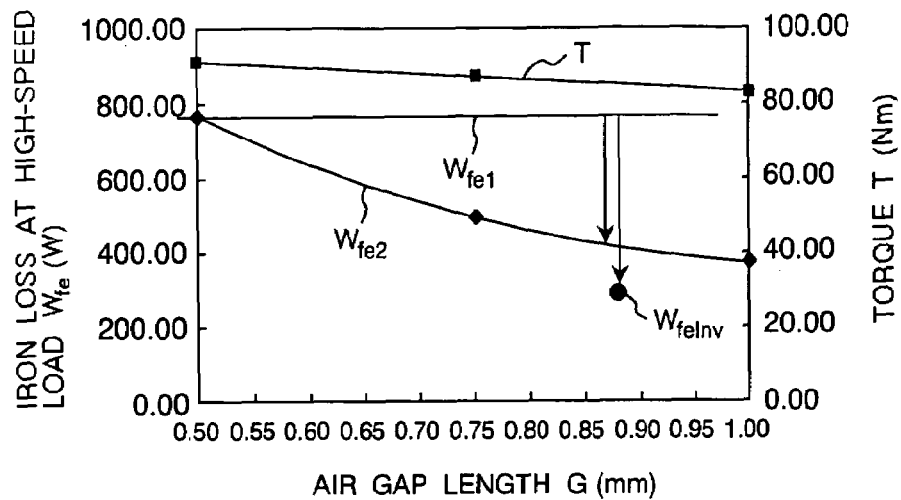
FIG. 6 is an illustration for iron loss of the rotor of the permanent magnet rotating electric machine of the first embodiment of the present invention.

FIGS. 5 and 6 are illustrations for iron loss of the rotor of the permanent magnet rotating electric machine of the first embodiment of the present invention.

FIG. 5 shows, in the high speed rotating region, the whole iron loss Wfe for the weak field current when the air gap length is fixed and the breakdown of the basic wave part and harmonic part. The drawing shows that, as mentioned above, when the weak field current is increased, the basic wave part of the iron loss is reduced, while the harmonic part is increased, and the whole iron loss is not reduced.

FIG. 6 shows the torque T when the air gap length is changed at a fixed weak field current and changes in the iron loss Wfe. The iron loss Wfe1 indicates an iron loss when the air gap length G is kept at 0.5 mm. The iron loss Wfe2 indicates an iron loss when the air gap length G is changed evenly and the drawing shows that when the air gap length is increased, the iron loss mainly due to a reduction in the harmonic part is suddenly reduced and the occurred torque T is reduced due to a reduction in the basic wave part of the magnetic flux density.

Further, the iron loss WfeInv shown in the drawing is the calculation result of the permanent magnet rotating electric machine having the structure of this embodiment shown in FIGS. 1 to 4. In the reduction comparison of the iron loss at the point where the torque becomes the same, an iron loss reduction effect of 35% or higher than the conventional one is shown and in the iron loss comparison, the iron loss reduction is 30% or more. Therefore, according to this embodiment, rather than just an increase in the air gap length, the ratio of (reduction in iron loss)/(reduction in torque) can be increased.

As a shape of the concavities 76, in any of the lines X1, X2, and X3 shown in FIG. 4, the reduction in the torque can be suppressed while reducing the iron loss. Among them, particularly as shown by the solid line X1 in FIG. 4, as a shape of the concavities 76, when the change in the air gap length at the central part of the magnetic poles is made smaller than the change in the air gap length at the end of the magnetic poles, the air gap distribution of the magnetic pole pieces 72 can be made larger at the center of the magnetic poles and smaller at the end thereof and can be made in a sine wave shape as a whole and the iron loss can be reduced.

Further, in this embodiment, the air gap length G3 of the auxiliary salient poles 71 is made smaller than the air gap lengths G1 and G2 of the magnetic pole pieces 72, thus the torque producing ratio of the auxiliary salient poles 71 not affecting greatly the iron loss of the permanent magnets 6 is increased and while keeping the torque reduction little, the iron loss can be reduced.

As explained above, according to this embodiment, the effect of iron loss can be reduced more and a highly efficient permanent magnet rotating electric machine can be obtained.

Next, by referring to FIG. 7, the constitution of the permanent magnet rotating electric machine of the second embodiment of the present invention will be explained. Here, the whole constitution of the permanent magnet rotating electric machine of this embodiment is the same as that shown in FIG. 1.

Figure 7:
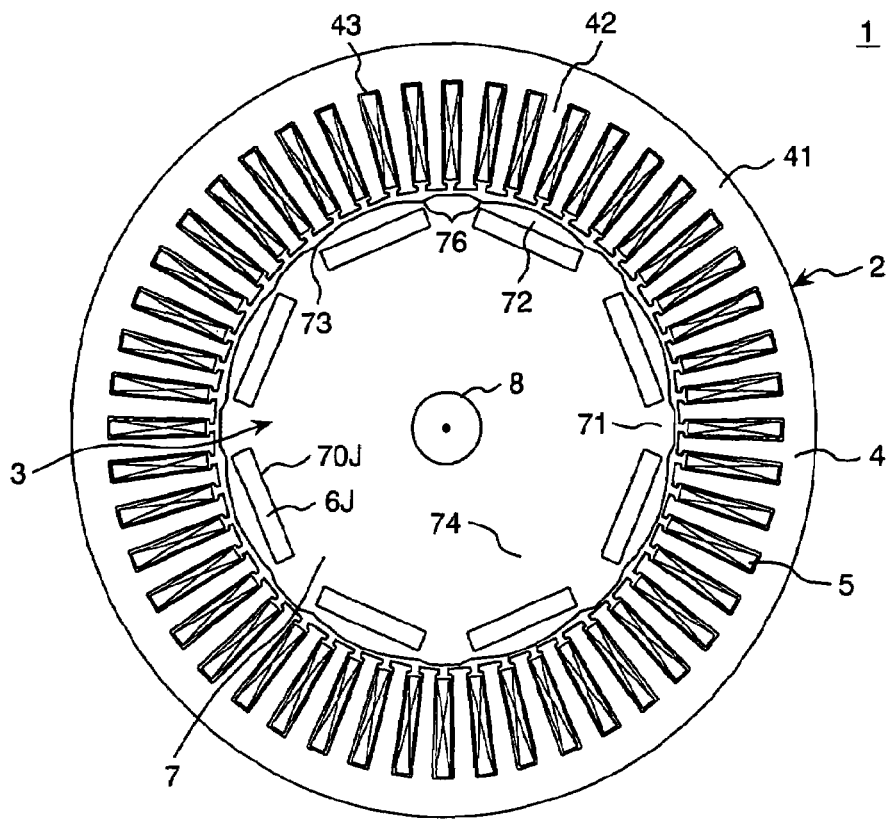
FIG. 7 is a cross sectional view showing the constitution of the permanent magnet rotating electric machine of the second embodiment of the present invention.

FIG. 7 is a cross sectional view showing the constitution of the permanent magnet rotating electric machine of the second embodiment of the present invention. FIG. 7, similarly to FIG. 2, is a cross sectional view in the direction perpendicular to the rotation axis and a view in the direction of A-A. Further, the same numerals as those shown in FIGS. 1 and 2 indicate the same parts.

In the constitution shown in FIG. 2, 2 permanent magnets constitute one magnetic pole of the rotor and are arranged in a V shape, while in this embodiment, as shown in FIG. 7, one permanent magnet 6J constitutes one magnetic pole of the rotor and is inserted into an insertion hole 70J in which the long sides of the section in a rectangular block shape are arranged so as to be directed in the peripheral direction of the rotor 3.

Although the arrangement of the permanent magnets, that is, the constitution of the magnetic poles is different from that shown in FIG. 2, the shape of the concavities 76 of the outer peripheral part of the rotor 3 formed on the magnetic pole pieces 72, similarly to that described in detail in FIG. 3, is a shape of concavities gently tilting from the central part of the magnetic poles to the end thereof on the air gap face of the magnetic pole pieces of the rotor iron core. Therefore, the air gap lengths G1 and G2 are the same as those shown in FIG. 4.

Since the permanent magnets are arranged in such a block shape, compared with the arrangement in the V shape shown in FIG. 2, the number of magnets per magnetic pole is reduced, so that the material expenses and the assembly man-hour are reduced, thus the rotating electric machine can be reduced in cost.

On the other hand, when the permanent magnets are arranged in the block shape, compared with the arrangement in the V shape, the magnetic flux density of the magnets on the air gap face side is reduced, so that in this respect, the torque is slightly reduced.

As described above, also by this embodiment, the effect of the iron loss can be reduced more and a highly efficient permanent magnet rotating electric machine can be obtained.

Next, by referring to FIGS. 8 to 10, the constitution of the permanent magnet rotating electric machine of the third embodiment of the present invention will be explained. Here, the whole constitution of the permanent magnet rotating electric machine of this embodiment is the same as that shown in FIG. 1.

Figure 8:
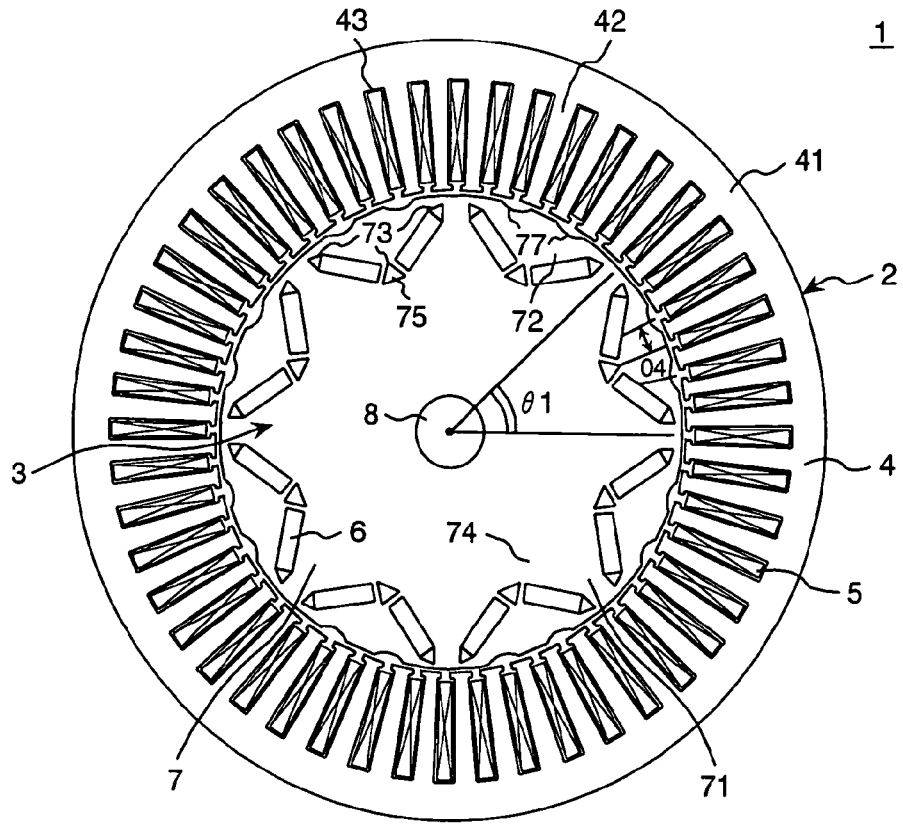
FIG. 8 is a cross sectional view showing the constitution of the permanent magnet rotating electric machine of the third embodiment of the present invention.

FIG. 8 is a cross sectional view showing the constitution of the permanent magnet rotating electric machine of the third embodiment of the present invention. FIG. 8, similarly to FIG. 2, is a cross sectional view in the direction perpendicular to the rotation axis and a view in the direction of A-A. Further, the same numerals as those shown in FIGS. 1 and 2 indicate the same parts.

In this embodiment, on the outer peripheral part of the magnetic pole pieces 72 of the rotor 3 of the permanent magnet rotating electric machine 1, at the position of θ4 from the center of the magnetic poles, concavities 77 are installed. The other constitution is the same as that shown in FIG. 2. However, the concavities 76 shown in FIG. 2 are not installed.

Next, by referring to FIGS. 9 and 10, the concavities 77 formed on the outer periphery of the magnetic pole pieces of the rotor of the permanent magnet rotating electric machine of this embodiment will be explained.

Figure 9:
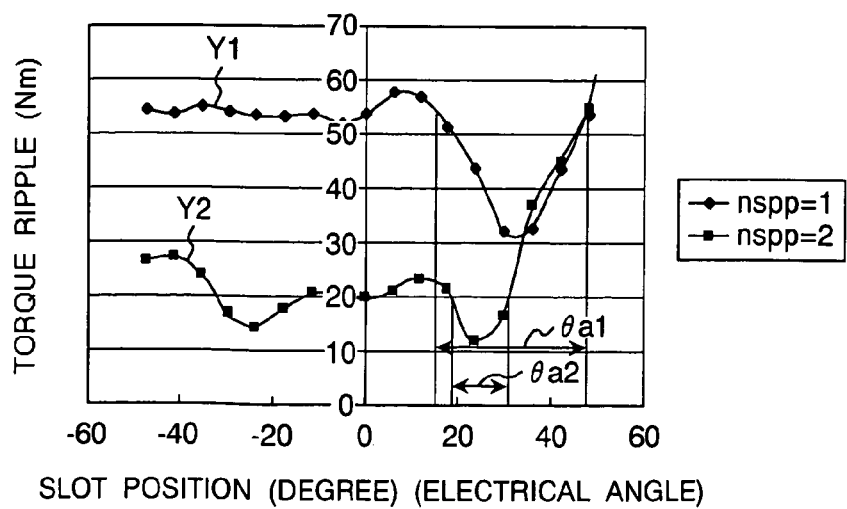
FIG. 9 is an illustration for the relationship between the concavities 77 and the torque ripple formed on the outer periphery of the magnetic pole pieces of the rotor of the permanent magnet rotating electric machine of the third embodiment of the present invention.
Figure 10:
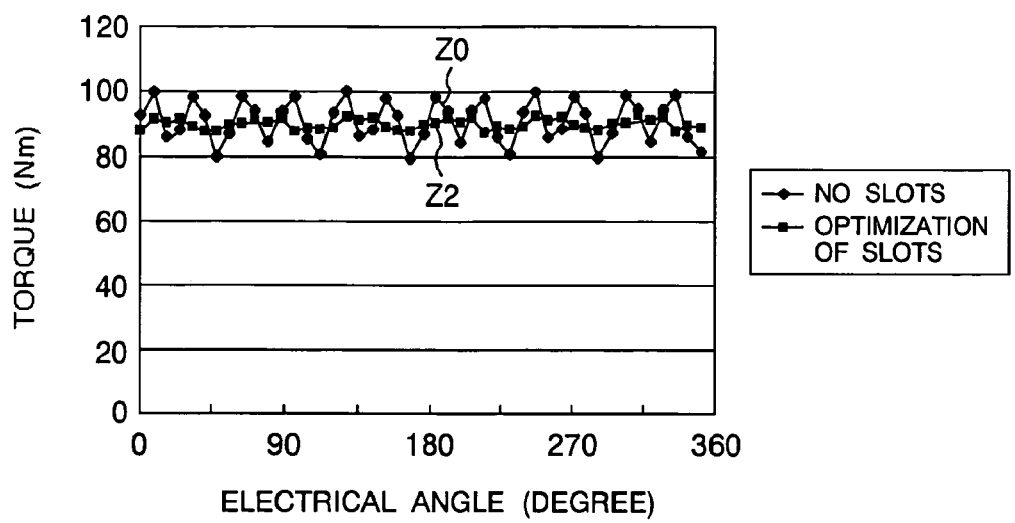
FIG. 10 is an illustration for the relationship between the concavities 77 and the torque ripple formed on the outer periphery of the magnetic pole pieces of the rotor of the permanent magnet rotating electric machine of the third embodiment of the present invention.

FIGS. 9 and 10 are illustrations for the relationship between the concavities 77 and the torque ripple formed on the outer periphery of the magnetic pole pieces of the rotor of the permanent magnet rotating electric machine of the third embodiment of the present invention.

FIG. 9 shows the torque ripple value Y2 under the maximum torque occurrence condition when the angle θ4 formed between the center of the magnetic poles and the central position of the concavities 77 is assumed as a variable. In the example shown in FIG. 8, when the number of slots per pole and per phase is 2 (48 slots, 3 phases, 8 poles), nspp=2.

Further, the torque ripple value Y1 shown in FIG. 9 indicates the characteristic of nspp=2 when the number of slots per pole and per phase is 1. In this case, the slot width and tooth width are set at double values of those when the number of slots per pole and per phase is 2. In the drawing, the positive side of the symbol θ indicates the region applied with the magnetizing force of the electromotive force by the stator windings in the rotational direction.

The torque ripple Y2 when the slots (the concavities 77) are not arranged, is 20 Nm when the number of slots per pole and per phase is 2. On the other hand, when the position of the concavities 77 is within the range from an electrical angle θa1 of 15° to 45° from the central position of the magnetic poles, the torque ripple can be reduced compared with a case of no concavities formed.

Further, the torque ripple Y1 when the slots (the concavities 77) are not arranged is 54 Nm when the number of slots per pole and per phase is 1. On the other hand, when the position of the concavities 77 is within the range from an electrical angle θa2 of 20° to 30° from the central position of the magnetic poles, the torque ripple can be reduced compared with a case of no concavities formed.

FIG. 10 compares the torque ripple (the solid line Z2) when an electrical angle θ is 24° and the hole size is optimized under the condition that the number of slots per pole and per phase is 2 with the torque ripple (the solid line Z0) when no hole is formed. As clearly shown in FIG. 10, when the concavities 77 are formed at a proper position of the magnetic pole pieces, the torque ripple can be reduced to about ⅓.

As described above, according to this embodiment, the torque ripple of the permanent magnet rotating electric machine can be reduced.

Further, for example, in Japanese Patent Application 8-251846 and Japanese Patent Application 2002-171730, an embedding type magnet rotor in which slots are arranged on both sides of magnetic pole pieces are disclosed. However, in the embedding type magnet rotor described in Japanese Patent Application 8-251846, the slots arranged on the rotor surface are different in the slot shape and slot position from those of this embodiment and are formed for magnetic flux leakage prevention between the magnetic pole pieces and the auxiliary salient poles but not for iron loss prevention and torque ripple reduction. Further, in the embedding type magnet rotor described in Japanese Patent Application 2002-171730, the slots are different in the slot shape and slot position from those of this embodiment and are intended to interrupt the magnetic flux by the reaction of the armature but are not intended to reduce the iron loss and torque ripple.

Next, by referring to FIG. 11, the constitution of the machine driving system of an electric car loading the permanent magnet rotating electric machine of each embodiment of the present invention will be explained.

Figure 11:
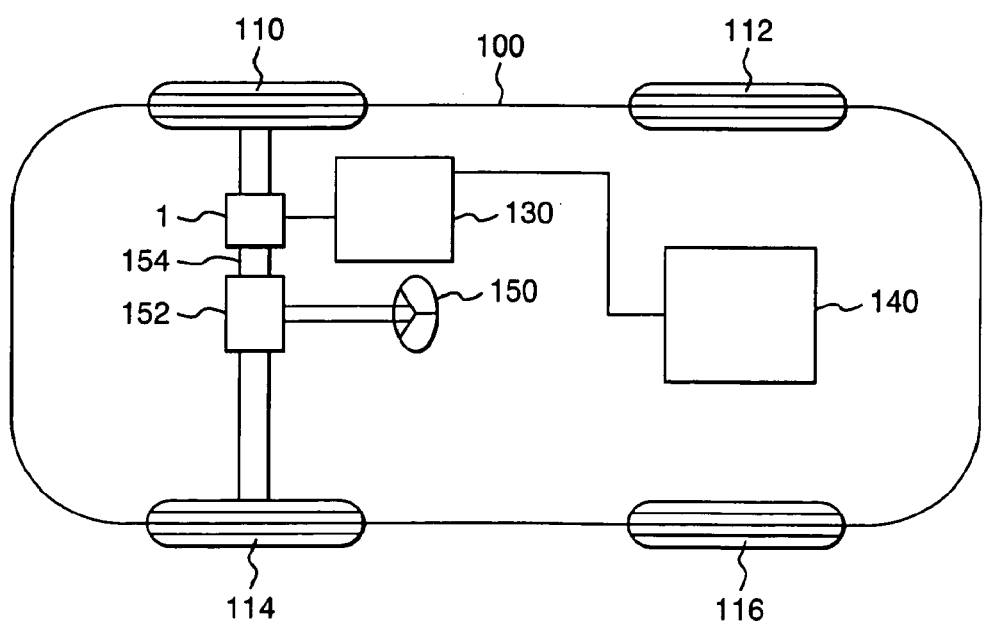
FIG. 11 is a block diagram showing the constitution of the machine driving system of the electric car loading the permanent magnet rotating electric machine of each embodiment of the present invention.

FIG. 11 is a block diagram showing the constitution of the machine driving system of the electric car loading the permanent magnet rotating electric machine of each embodiment of the present invention.

In the drawing, the permanent magnet rotating electric machine 1 is a one described in any of the aforementioned embodiments. A frame 100 of the electric car is supported by 4 wheels 110., 112, 114, and 116. The electric car is driven by the front wheels, so that the permanent magnet rotating electric machine 1 is directly attached to a front axle 154. The control torque of the permanent magnet rotating electric machine 120 is controlled by a controller 130. As a power source of the controller 130, a battery 140 is installed, and power is supplied to the permanent magnet rotating electric machine 1 from the battery 140 via the controller 130, and the permanent magnet rotating electric machine 1 is driven, and the wheels 110 and 114 are rotated. The rotation of a handle 150 is transferred to the two wheels 110 and 114 via a transfer mechanism composed of a steering gear 152, a tie rod, and a knuckle arm and the angle of the wheels is changed.

Further, in this embodiment, a case that the front wheels 110 and 114 are driven to rotate by the permanent magnet rotating electric machine 1 is described. However, the rear wheels 112 and 116 may be driven to rotate.

When power-running an electric vehicle (at the time of starting, traveling, acceleration, etc.), the front wheels 110 and 114 are driven by the motor of the permanent magnet rotating electric machine 1. The voltage of the battery 140 is supplied to the permanent magnet rotating electric machine 1 via the controller 130 and the permanent magnet rotating electric machine 1 is driven and generates rotation output. By doing this, the front wheels 110 and 114 are driven to rotate.

When regenerating the electric vehicle (at the time of stepping on the brake, easing up on the accelerator, or stopping on the accelerator), the rotation output of the front wheels 110 and 114 is transferred to the permanent magnet rotating electric machine 1 via the front axle 154 and the permanent magnet rotating electric machine 1 is driven to rotate. By doing this, the permanent magnet rotating electric machine 1 operates as a generator. By this operation, in the stator windings of the permanent magnet rotating electric machine 1, 3-phase AC power is generated. The generated 3-phase AC power is converted to predetermined DC power by an inverter and is charged in the battery 140.

Further, in the above description, it is explained that the permanent magnet rotating electric machine is used to drive the wheels of an electric car. However, even if the machine is applied to a hybrid electric car having a hybrid drive mechanism by an engine and a motor or the so-called engine start device arranged between an engine and a drive mechanism for starting the engine and generating power, high efficiency and low noise of the drive portion of the hybrid electric car can be realized by the same effect.

As explained above, according to this embodiment, when the permanent magnet rotating electric machine of low iron loss and low torque ripple of the present invention is loaded in an electric car, an electric car characterized by little iron loss at a high speed, low fuel expenses, low vibration, and low noise can be obtained by a simple constitution.

What is claimed is:

1. A permanent magnet electric rotating machine, comprising:
    a stator;
    a rotor having a rotor iron core and being arranged opposite said stator with a rotation air gap therebetween;
    a plurality of magnetic poles in said rotor iron core and arranged in a peripheral direction of said rotor in which polarity is alternately arranged;
    a plurality of auxiliary magnetic pole portions arranged in the peripheral direction between said magnetic poles; and
    bridge portions which connect magnetic pole piece portions formed between said magnetic poles and a surface of said rotor with said auxiliary magnetic pole portions, wherein
    each said magnetic pole has two permanent magnets of common polarity and in a V-shape arrangement opening towards said stator,
    a core portion of said rotor iron core and a first magnetic gap are provided between each of the inner ends of said two permanent magnets, said core portion being provided to connect said magnetic pole piece portions with said rotor iron core radically inward of said magnetic poles, and
    second magnetic gaps are provided between outer ends of said two permanent magnets and said bridge portions.

2. A permanent magnet rotating electric machine according to claim 1 wherein
    said rotor iron is further composed of concavities formed on an air gap face of said magnetic pole pieces.

3. A permanent magnet rotating electric machine according to claim 2, wherein:
    a change in a length of the rotation air gap at a central part of said magnetic poles at a position of said concavities is smaller than a change in the length of the rotation air gap at an end of said magnetic poles.

4. A permanent magnet rotating electric machine according to claim 2, wherein:
    a length of the rotation air gap of said auxiliary magnetic pole portions is smaller than the length of the rotation air gap of said magnetic pole pieces.

5. A permanent magnet rotating electric machine according to claim 2, wherein:
    said concavities are within an electrical angle range of 20° to 30° from said magnetic pole center where there are two slots of said stator iron core per pole and per phase.

6. A permanent magnet rotating electric machine according to claim 2, wherein:
    said concavities are within an electrical angle range of 15° to 45° from said magnetic pole center where there is one slot of said stator iron core per pole and per phase.

7. An electric car comprising a permanent magnet rotating electric machine, wheels driven by said permanent magnet rotating electric machine, and control means for controlling drive torque outputted by said permanent magnet rotating electric machine, wherein:
    said permanent magnet rotating electric machine is composed of a stator;
    a rotor having a rotor iron core and being arranged opposite said stator with a rotation air gap therebetween;
    a plurality of magnetic poles in said rotor iron core and arranged in a peripheral direction of said rotor in which polarity is alternately arranged;
    a plurality of auxiliary magnetic pole portions arranged in the peripheral direction between said magnetic poles; and
    bridge portions which connect magnetic pole piece portions formed between said magnetic poles and a surface of said rotor with said auxiliary magnetic pole portions, wherein
    each said magnetic pole has two permanent magnets of common polarity and in a V-shape arrangement opening towards said stator,
    a core portion of said rotor iron core and a first magnetic gap are provided between each of the inner ends of said two permanent magnets, said core portion being provided to connect said magnetic pole piece portions with said rotor iron core radially inward of inside said magnetic poles, and
    second magnetic gaps are provided between outer ends of said two permanent magnets and said bridge portions.

8. An electric car according to claim 7, wherein
    said rotor iron core is further composed of
    magnetic pole pieces positioned on an air gap face of said permanent magnets for forming a magnetic path of said permanent magnets,
    auxiliary magnetic poles projected up to said air gap face of said permanent magnets for producing reluctant torque, and
    a stator yoke positioned on a reversed air gap face of said permanent magnets for forming a magnetic path of said auxiliary magnetic poles and said permanent magnets, and further includes concavities formed on an air gap face of said magnetic pole pieces.

9. An electric car according to claim 8, wherein:
    said concavities are within an electrical angle range of 20° to 30° from said magnetic pole center where there are two slots of said stator iron core per pole and per phase.

10. An electric car according to claim 8, wherein:
    said concavities are within an electrical angle range of 15° to 45° from said magnetic pole center where there is one slot of said stator iron core per pole and per phase.

* * * * *